Figure 1:
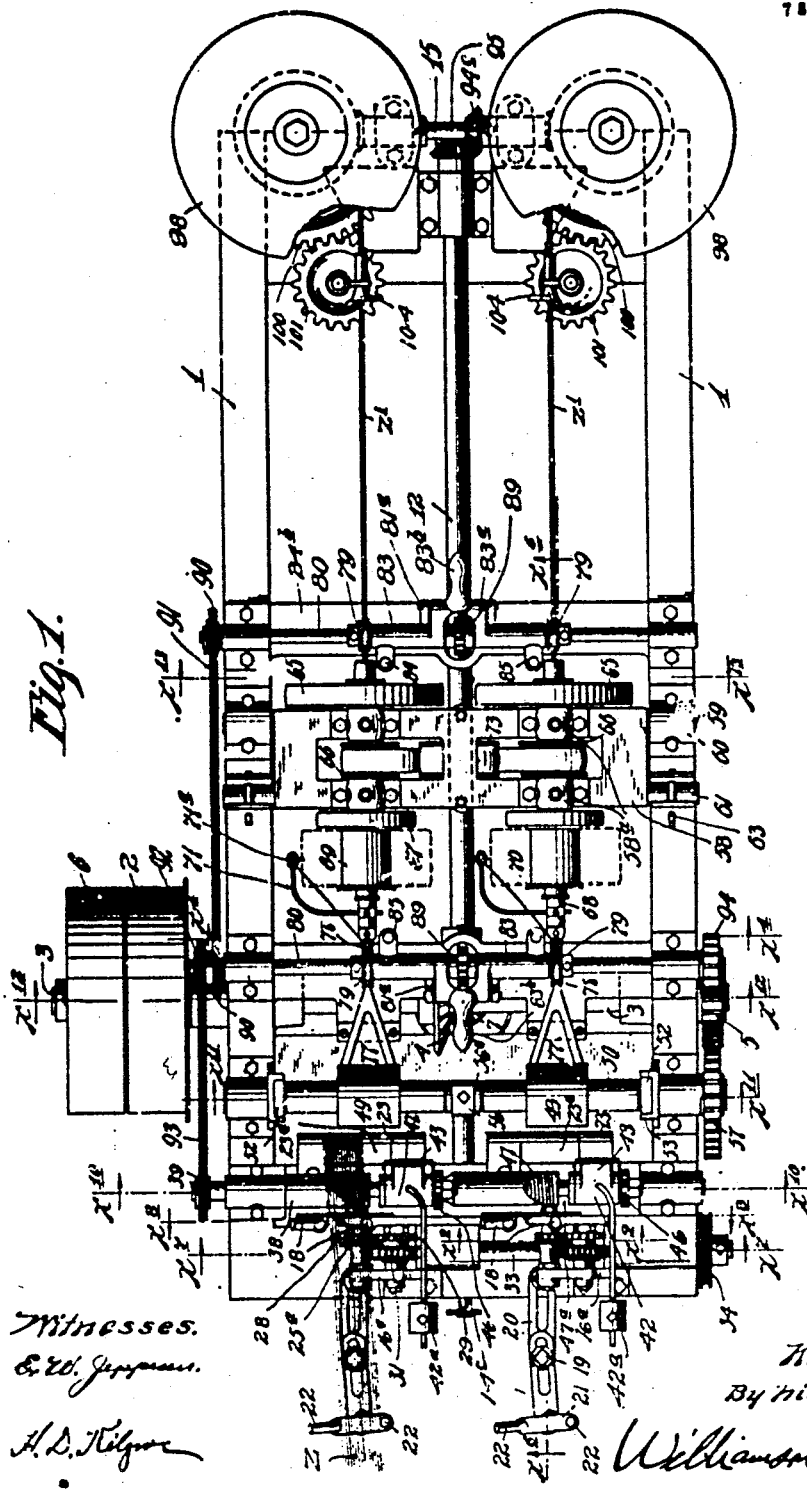

No. 896,783. PATENTED AUG. 25, 1908.
K. WESSEL.
GRASS TWINE MACHINE.
APPLICATION FILED SEPT. 12, 1904.
7 SHEETS—SHEET 3.
Fig. 3.
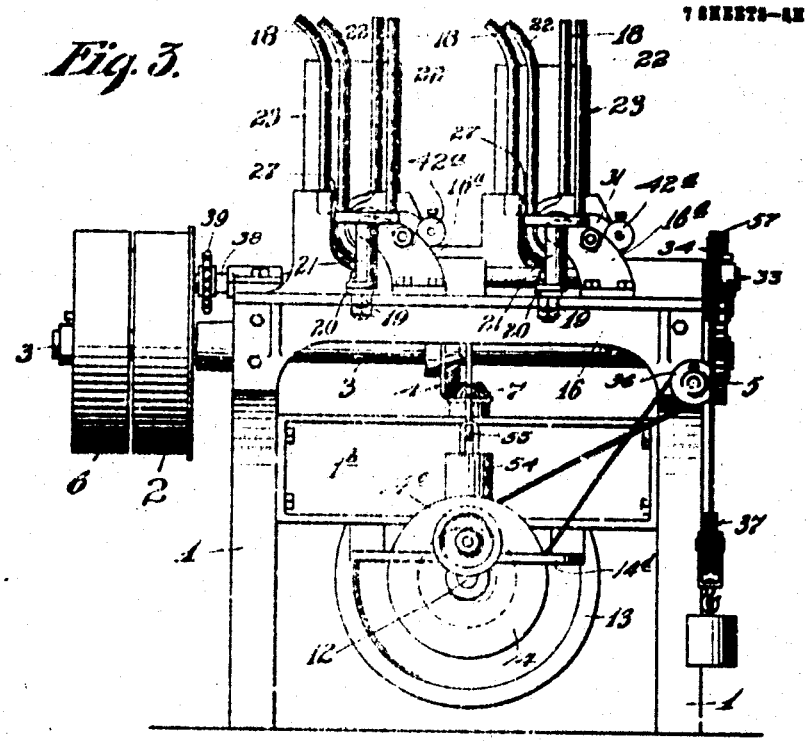
Fig. 4.
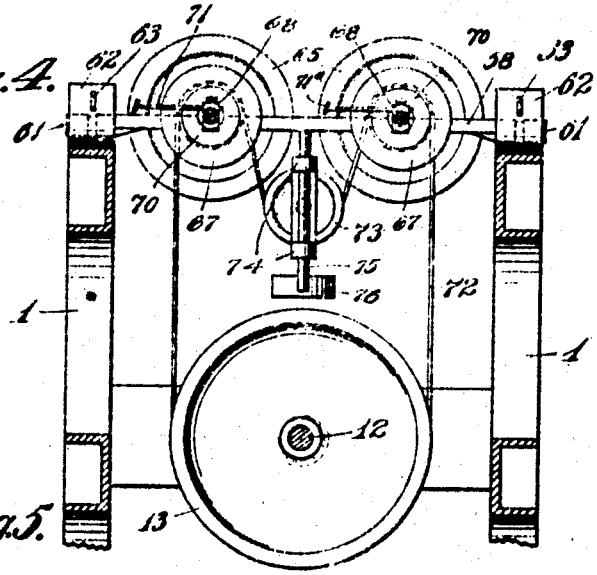
Fig. 5.
Witnesses.
Inventor:
Karl Wessel
By his Attorneys
William Merchant

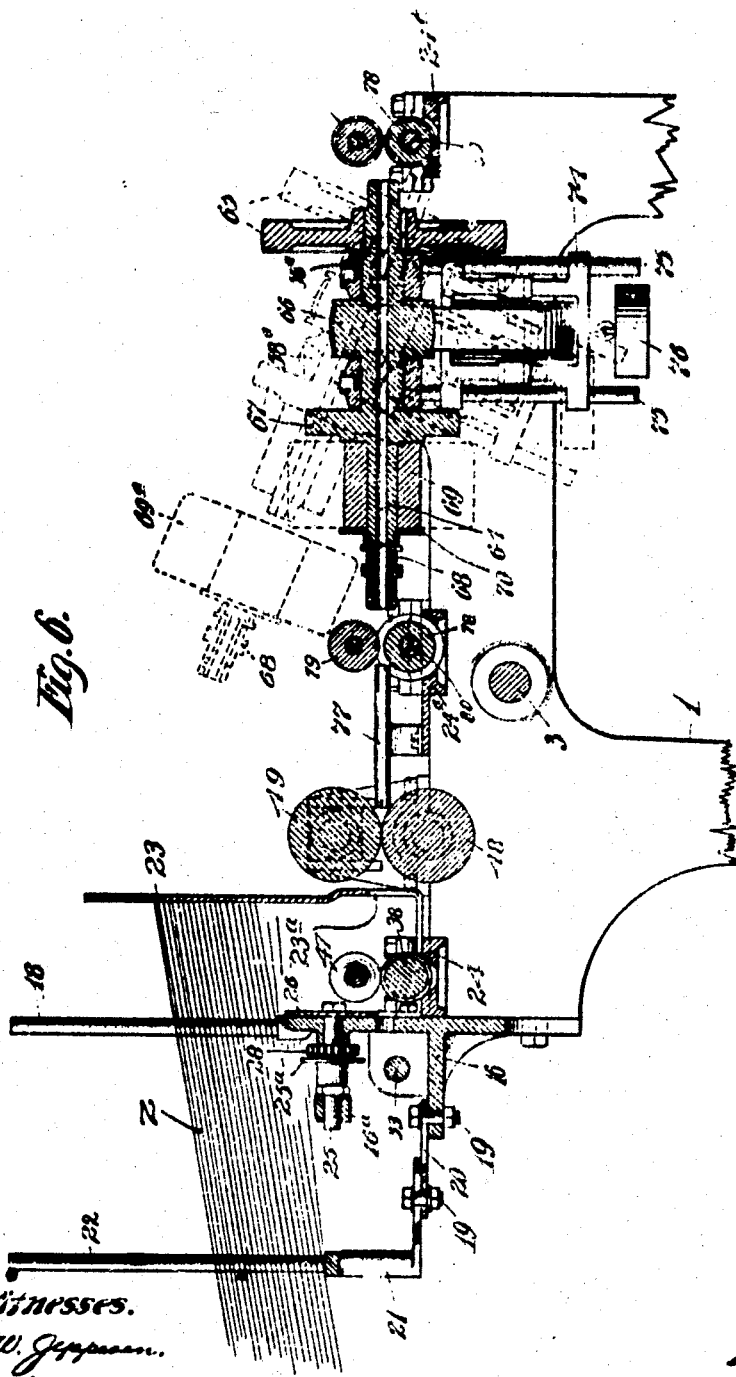

No. 896,783. PATENTED AUG. 25, 1908.
K. WESSEL.
GRASS TWINE MACHINE.
APPLICATION FILED SEPT. 12, 1904.
7 SHEETS—SHEET 5.
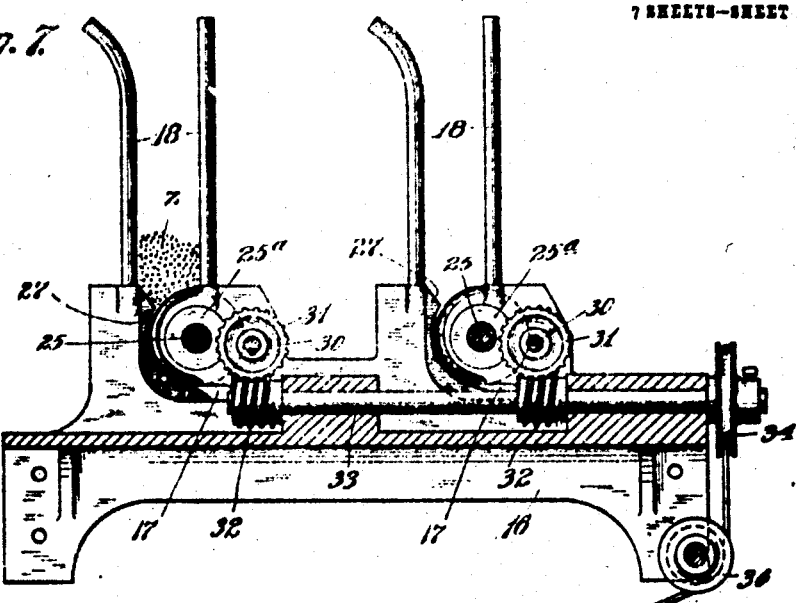
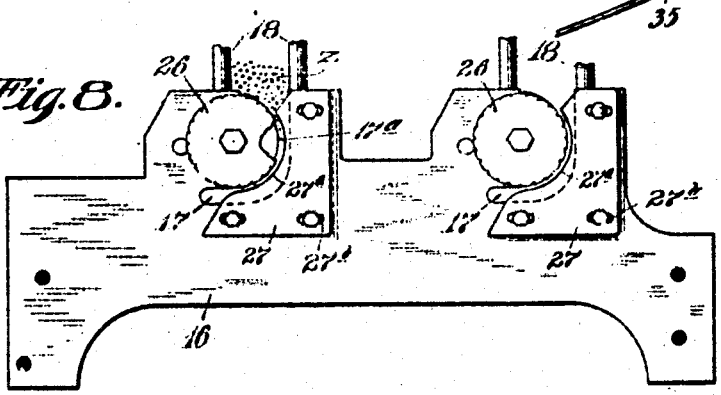
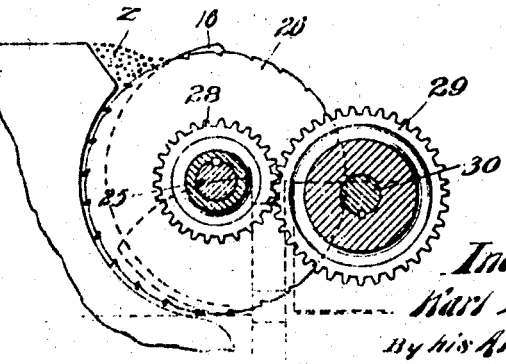
Witnesses.
E. W. Jeppesen
H. D. Kilgore
Inventor:
Karl Wessel.
By his Attorneys.
Williamson & Merchant No. 896,783. PATENTED AUG. 25, 1908.
K. WESSEL.
GRASS TWINE MACHINE.
APPLICATION FILED SEPT. 12, 1904.

7 SHEETS—SHEET 6.

Witnesses.

Inventor:
Karl Wessel.
By his Attorneys
Williamson & Merchant

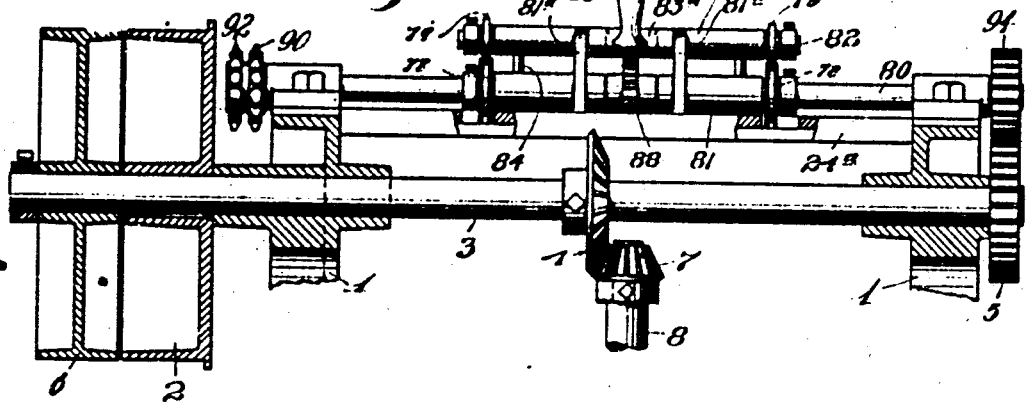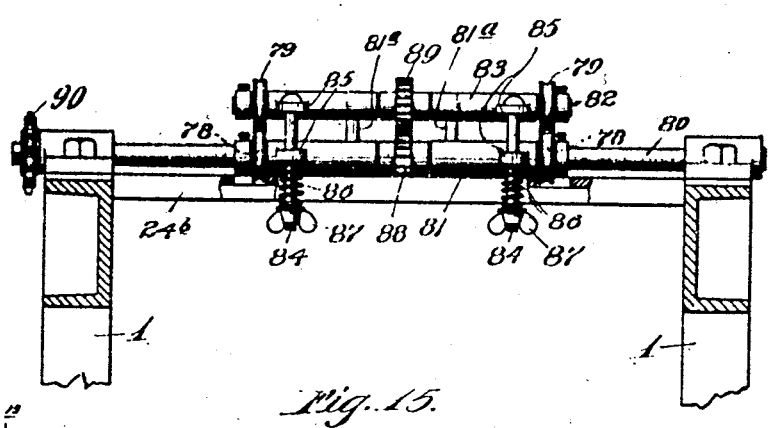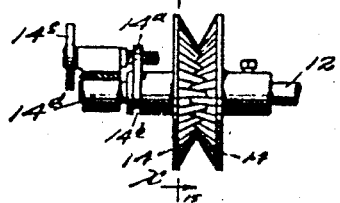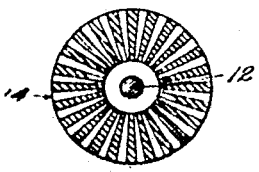

UNITED STATES PATENT OFFICE.

KARL WESSEL, OF ST. PAUL, MINNESOTA, ASSIGNOR TO FREDERICK E. WAITE AND OSSIAN T. WAITE, OF OSHKOSH, WISCONSIN.

GRASS-TWINE MACHINE.

No. 896,783.

Specification of Letters Patent.

Patented Aug. 25, 1908.

Application filed September 12, 1904. Serial No. 224,086.

*To all whom it may concern:*

Be it known that I, KARL WESSEL, a citizen of the United States, residing at St. Paul, in the county of Ramsey and State of Minnesota, have invented certain new and useful Improvements in Grass-Twine Machines; and I do hereby declare the following to be a full, clear, and exact description of the invention, such as will enable others skilled in the art to which it appertains to make and use the same.

This invention relates to machines of the class employed in making grass twine, and has for its object to provide a machine of very high efficiency, both as to quantity and quality of work turned out, which is of simple construction and hence of small first cost, easy to maintain in operative condition and capable of being operated by unskilled persons, and which will take up but small space, thus making possible the installment of a plant of large capacity within a comparatively small building.

To the above ends this invention consists of the novel devices and combination of devices hereinafter described and defined in the claims.

The invention is directed chiefly to improved mechanism for selecting, from a suitable grass holder, the blades of grass in a regular and uniform order of succession, and delivering the same to the twine forming mechanism proper. However, the invention involves minor but important novel features of construction and combinations of parts which will be hereinafter described and defined in the claims.

Successful grass feeding mechanisms for machines of the character above noted have, prior to my present invention, been very bulky, heavy, expensive to build, liable to get out of order, and have required a great deal of power to drive them, and a large amount of expert help to run them and maintain them in operative condition. Furthermore, so far as I am aware, there has not been provided, prior to my invention, a grass feeding mechanism having a capacity in speed equal to the maximum operative speed of the twine-forming mechanism. Otherwise stated, in machines now in use, the grass-feeding mechanism has acted as a drag on the machine, making it impossible to run the twine-forming mechanism proper up to its highest working capacity. Hence, one important feature which I have had in mind in designing my improved machine, and which I have accomplished in the production thereof, has been the provision of grass-feeding mechanism capable of supplying the grass to the twine forming mechanism when the latter is running at its highest operative speed. By the accomplishment of this result, as I have demonstrated in practice, I have more than doubled the capacity of machines of this general character, considered with respect to the number of twine-forming devices used in a particular machine. Calculated with respect to space taken up, with respect to cost, and with respect to the number of persons required for operating the machines, and to keep the same in repair, I have many times more than doubled the capacity of such machines.

The accompanying drawings illustrate my invention as embodied in a machine which I have built and put into actual use. In the said drawings, like characters indicate like parts throughout the several views.

Figure 2:
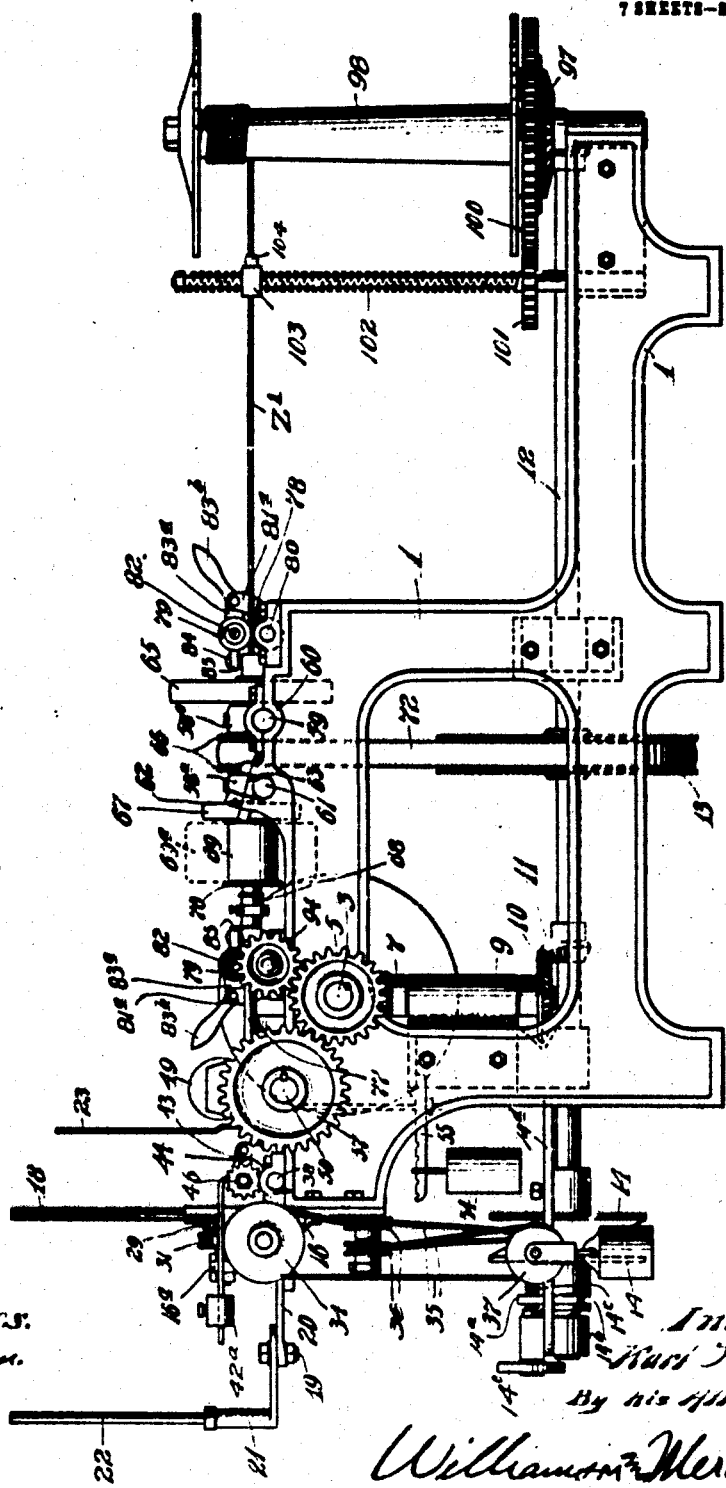
Figure 10:
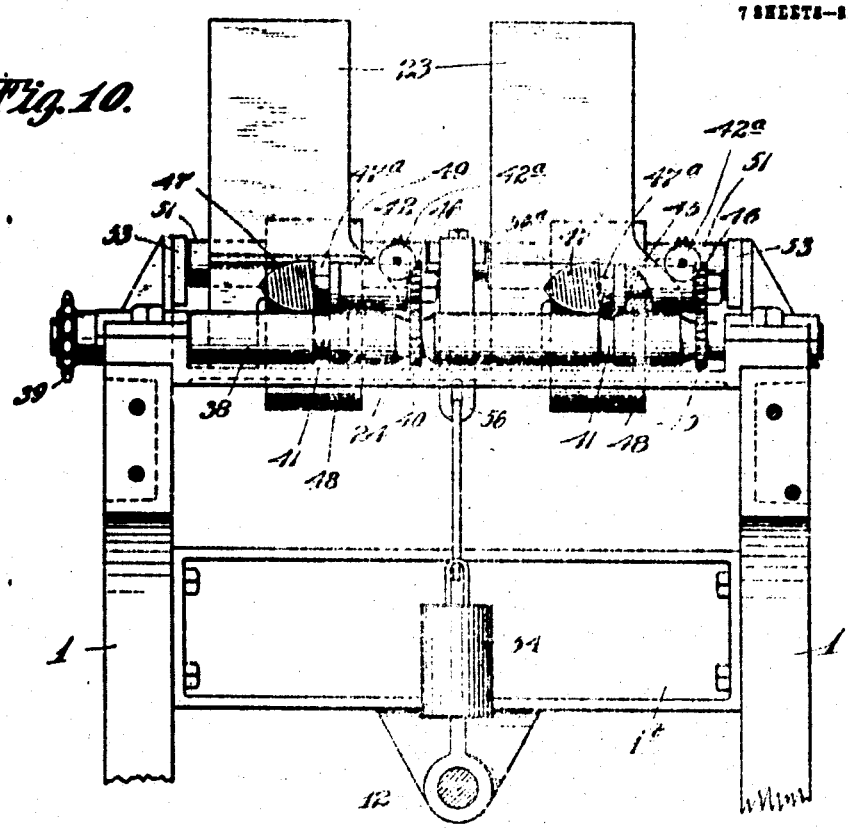
Figure 11:
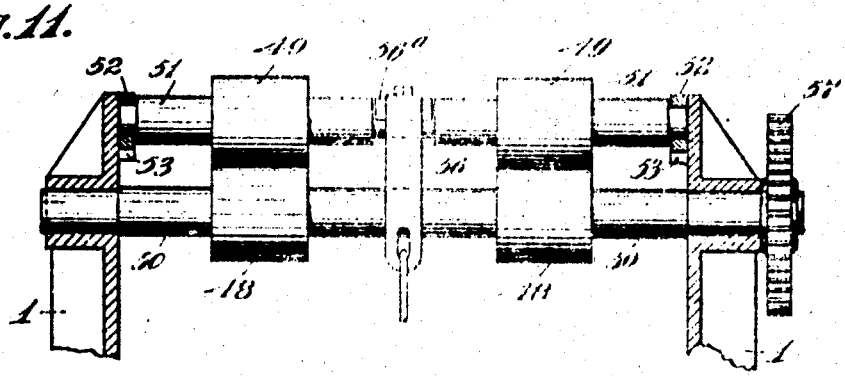

Figure 1 is a plan view of the complete machine, some parts being broken away. Fig. 2 is a right side elevation of the machine. Fig. 3 is a front elevation of the machine. Fig. 4 is a transverse vertical section, taken through the machine on the line $x^4 \ x^4$ of Fig. 1. Fig. 5 is a detail in elevation, looking at the rear end of the machine, some parts being broken away. Fig. 6 is a vertical longitudinal section taken through a portion of the machine on the line $x^6 \ x^6$ of Fig. 1. Fig. 7 is a transverse vertical section taken through the front portion of the machine on the line $x^7 \ x^7$ of Fig. 1. Fig. 8 is a detail in rear elevation, showing parts of the so-called primary feed device, the said parts being separated from the machine, on the line $x^8 \ x^8$ of Fig. 1. Fig. 9 is a detail of transverse vertical section, taken on the line $x^9 \ x^9$ of Fig. 1. Fig. 10 is a transverse vertical section taken through the machine approximately on the line $x^{10} \ x^{10}$ of Fig. 1, some parts being left in full. Fig. 11 is a transverse vertical section, taken on the line $x^{11} \ x^{11}$ of Fig. 1, some parts being broken away. Fig. 12 is a transverse vertical section, taken through the machine on the line $x^{12} \ x^{12}$ of Fig. 1, some parts being broken away. Fig. 13 is a transverse vertical section, taken through the machine on the line $x^{12} x^{13}$ of Fig. 1. Fig. 14 is a detail in side elevation, showing an expansible pulley; and Fig. 15 is a section on the line $x^{15} x^{15}$ of Fig. 14.

All of the running parts of the machine are mounted directly or indirectly on a heavy, approximately rectangular, skeleton frame 1, preferably made up of castings. Power is transmitted to the running parts of the machine through a power-driven belt (not shown) which runs over a pulley 2, carried by a countershaft 3, extended transversely of the machine, and journaled in suitable bearings on the side brackets thereof, (see particularly Figs. 1, 2 and 12), which shaft carries a bevel gear 4 at its intermediate portion, and a spur gear 5 at one end, and is provided, adjacent to the pulley 2, with a loose pulley 6, over which loose pulley the belt may run when the machine is thrown out of action. The bevel gear 4 meshes with a pinion 7, carried by a short vertical shaft 8, mounted in a bearing 9, rigidly secured to a transverse portion of the machine frame, as best shown in Figs. 2 and 12. At its lower end, the shaft 8 carries a bevel gear 10 that meshes with a bevel pinion 11, carried by a long countershaft 12 that extends from front to rear of the machine, centrally, and near the lower portion of the frame, and is journaled in suitable bearings on transverse portions of the said frame 1. This long countershaft 12 further carries a pulley 13 at its intermediate portion, an expansible pulley 14 at its front end, and a miter gear 15 at its rear end. The pulley 14 is, as shown, made up of a relatively fixed, and a slidable section, which sections interlap with each other. A pronged arm 14ᵃ engages an annular groove 14ᵇ in the hub of the slidable pulley section, and this arm is engaged by the threaded end of an adjusting screw 14ᶜ, which is swiveled in a bearing 14ᵈ, rigid on the machine frame.

All of the running parts of the machine receive motion from the countershafts above noted through devices which will be hereinafter described in connection with a description of the several groups or classes of mechanisms.

The complete machine illustrated may be conveniently treated as made up of the following classes of mechanisms, to-wit:—The grass holder or holders, which are adapted to hold loose bundles of the grass in straight, parallel, arrangement: the grass feeding mechanism, consisting of a primary feed device, or grass selector, which is arranged to force the grass blades from the holder in a regular order of succession, by a lateral or sidewise movement, as distinguished from a endwise movement; and a secondary feed device, which receives the grass blades from the primary feed device or selector, as the same is fed laterally thereto, and imparts endwise movements to the grass blades and starts them on through the machine, in an regular order of succession, overlapped with each other so as to give the proper body to the twine: the crushing mechanism which receives the overlapped grass from the secondary feed device, and operates thereon to crush or flatten out the said grass blades, thereby giving increased flexibility thereto: the twine forming mechanism, which compacts the grass blades into twine form, with the blades of the grass in straight parallel arrangement, as distinguished from spiral or twisted form, and completes the twine by wrapping the compacted blades about with a binding thread: and the reeling mechanism, which serves to wind up onto large spool or spools the completed twine. The reeling mechanism illustrated is of standard construction and it will be understood that any suitable reeling mechanism may be employed. Furthermore, it will be understood that various combinations and rearrangements of the several groups or mechanisms above enumerated, and arrangements of the elements of the said groups, may be made within the scope of my invention as herein set forth and claimed.

With the above introductory statements made, I will now describe in detail the construction of the several classes of mechanism noted, as they are carried out in the machine which I have constructed, and which is illustrated in the accompanying drawings. The machine illustrated is a double machine, that is, is adapted to simultaneously make two lines of twine. In the following description I will generally describe but a single set of the said several mechanisms, and will refer to the duplicate arrangement only in so far as may be necessary to connect the duplicate parts to the countershafts above noted.

*Grass holder.*—Extending transversely of the machine, and rigidly secured to the upper portions of the forwardly projecting ends of the sides of the frame 1, is a supporting bracket 16, the upwardly projecting vertical flange of which is formed with a segmental feed slot 17 that flares at its upper extremity, forming a receiving crotch between a pair of upright retaining posts 18, rigidly secured to said flange, as best shown in Figs. 6, 7 and 8. Adjustably secured to the horizontal flange of the bracket 16, by means of nutted bolts 19 and a slotted link 20 (see Figs. 1, 3 and 6), is a supporting head 21 having a transversely extended upper end, from which rises a pair of laterally spaced upright retaining posts 22. The two posts 18 and the two posts 22, serve to hold in loosely compacted form, a bundle of grass, having its blades straight and parallel to each other (see Figs. 1 and 6, wherein the character $z$ indicates the grass blades). The butt ends of the grass blades are projected toward the rear of the machine, and to even them up, and to maintain an alinement of their butts, they are placed against a vertically disposed stop plate 23 (see Figs. 1 and 6), which stop plate is as shown, rigidly secured to a transverse supporting bar 24 rigidly supported by the machine frame just rearward of the bracket 16. At its lower portion, and in line with the lower portion of the curved slot 17, the stop plate 23 is cut away, as shown at 23ª, and for a purpose which will presently appear.

*Grass feeding mechanism.*—Secured on a short countershaft 25, (see Figs. 3, 6, 8, and 9), mounted in the vertical flange of the bracket 16, and in a bearing 16ª thereon, is a notched disk 26 which runs in close contact with the said vertical supporting flange, and constitutes the primary feed device or grass selector. A portion of the notched periphery of this disk 26 projects into the slot 17, or, otherwise stated, the wall 17ª of said groove, at its intermediate portion, falls back of the periphery of said disk, leaving the notches or teeth thereof exposed in line with said slot 17 throughout its intermediate portion; but at its upper and lower extremities, said wall 17ª projects beyond the said notches or teeth, as best shown in Figs. 8 and 9. The importance of this construction will appear in the description of the operation.

Rigidly secured to the rear face of the vertical flange of the bracket 16, in the plane of the disks 26, is a throat regulating plate 27 which, adjacent to the abutting edge of said disk, is formed with a segmental guide surface 27ª that extends approximately concentric with said disk. This throat plate 27 is adjustable toward and from the disk, to vary the throat or space opening between the said curved surface 27ª and the notched periphery of the disk; such adjustments, as shown, being made possible by screw and slot connections 27ᵇ. As is evident, for a given speed of rotation of the disk, the amount of grass that will be fed from the holders by said disk, will depend on the size of the throat opening between said disk and throat plate.

The shaft 25 of the disk 26, carries a small spur gear 28, and a gear guarding disk 25ª (see Figs. 6, 7 and 9). The gear 28, (see also Fig. 1) meshes with the gear 29 of a spindle 30 mounted in the vertical flange of the bracket 16 and in the bearings 16ª thereof. This spindle 30 carries a worm gear 31 that meshes with a worm 32 carried by a transverse shaft 33 journaled in lugs formed on the bracket 16. At one projecting end, the shaft 33 carries a grooved sheave 34.

The shaft 33 is driven from the longitudinally extended countershaft 12, as shown, by an endless rope or cord belt 35, which runs over the pulley 14 of the said shaft 12, over the sheave 34 of said shaft 33, and over idle guide sheaves 36, shown as journaled on the bearing bracket 16. The slack of the belt 35 is taken up by a weighted guide sheave 37, applied to a depending loop of said belt, as best shown in Figs. 2, 3 and 7.

The secondary feed device is best illustrated in Figs. 1, 6 and 10, and referring to the parts thereof, the numeral 38 indicates a roller, which extends transversely of the machine, just in the rear of the primary or selecting wheel 26, and is journaled in suitable bearings formed, as shown, on the ends of the frame bar 24 already noted. The shaft of this roller projects at one end, and is provided with a sprocket 39, and at its intermediate portion, said roller carries a spur gear 40, and is formed with an annular groove 41. In the duplicate arrangement of the machine, said roller 38 is, of course, provided with two gears 40 and two grooves 41.

Overlying that portion of the shaft 38 which is between the gear 40 and coöperating groove 41, is a bearing sleeve 42, formed with a rearwardly projecting hinge lug that is hinged or pivotally connected, at 43, to lugs 44, rigidly secured on the heretofore noted frame bar 24 (see Figs. 1, 2 and 6). Loosely journaled in the bearing sleeve 42, is a shaft 45 which, at one end, carries a spur gear 46 that meshes with the gear 40 of the roller 38. At its other end, to-wit, that end which projects toward the left with respect to Fig. 10, the shaft 45 is provided with an enlarged head or roller 47, having an annular groove 47ª that alines with the groove 41 of the roller 38. Said roller 47 is made conical or tapered toward a point, in a direction toward the left, and is formed with very fine threads at that portion which contacts with or lies close to the roller 38 at the left of the groove 41. It will thus be seen that the coöperating feed rollers 38 and 47 are caused to rotate in reverse directions, by means of the gears 40 and 46, and are formed with diverging end or axial surfaces which adapt them to receive grass blades forced therebetween by lateral movements. By reference to Fig. 10, it will be noted that the diverging surfaces of the rollers 38 and 47 are so related to the so-called "throat-opening" between the disk 26 of the primary feed device, and the coöperating surface of the throat-plate 27, that blades of grass moved laterally by said disk will be delivered between the converging surfaces of the said two rollers. The numeral 42ª indicates weighted arms, applied to the bearing sleeves 42.

*Crushing mechanism.*—The grass fed endwise by the feed rollers of the secondary feed device is fed through the passage 23ª of the stop plate 23, and between a pair of heavy crushing rollers 48 and 49, carried respectively by shafts 50 and 51, the former of which shafts is journaled in fixed bearings on the sides of the frame 1, and the latter of which is journaled in sliding boxes 52 that are mounted to move vertically in guides 53 on the side frames of the machine, (see particularly Figs. 1, 6 and 11). In the double machine illustrated, the rollers 48 and 49 are, of course, duplicated. Said rollers are pressed together, under increased strain, by a weight 54, shown as adjustably applied to a lever 55 which is fulcrumed to a transverse section 1ᵇ of the frame 1, and is connected to the intermediate portion of the shaft 51, by a strap 56, having a half bearing 56ᵃ that rests loosely on said shaft (see particularly Figs. 2, 10 and 11). As is evident, the rollers 49 are so mounted that they are free to rise and permit the grass to pass between the same and the rollers 48, but are held downward under such pressure that they will crush and flatten out blades of grass, and thereby increase the flexibility of the grass, by disintegrating the brittle portion thereof. The pressure of the rollers 49 may be varied by adjustments of the weight 54 on the lever 55. Rotary motion is imparted from the countershaft 3 to the lower roller shaft 50, through a gear 57 on the latter, which meshes with the gear 5 on the former, (see Figs. 2 and 11).

*Twine-forming mechanism.*—This mechanism is shown throughout Figs. 1, 2, 4, 6, 12 and 13. The numeral 58 indicates a transversely extended spindle supporting frame which, at its ends, and near its rear edge, is provided with trunnions 59 that are journaled in bearings 60 on the sides of the frame 1. At its ends, near its forward edge, the frame 58 is provided with trunnion-like projections 61 that normally rest in flanged seats 62 formed on the sides of the main frame 1, and they are rigidly held down, as shown, by keys 63 driven through the flanges of said seats, as best shown in Figs. 1 and 2. When the keys 63 are removed, the frame 58 is capable of pivotal movement on its trunnions 59, as and for a purpose which will hereinafter appear. Mounted in bearings 58ᵃ on the frame 58, is a hollow spindle 64 which, as shown, carries at its rear end a fly wheel 65, and is provided with a pulley 66, the latter of which works in a clearance passage cut in the intermediate portion of said frame 58. At its forwardly projecting end, the spindle 64 is constructed to hold a thread containing spool, and for this purpose is provided, just forward of the frame 58, with a disk-like projection 67. The extreme forward end of the spindle 64 is exteriorly threaded, and onto this threaded end is screwed a sleeve like supplemental spindle section 68. The numeral 69 indicates the annular core of the spool, and 69ᵃ indicates the body of thread contained thereon, the latter being indicated by dotted lines only in Figs. 1 and 6. The core 69 is pressed against the disk 67, and at its other end, it is in turn pressed by a washer 70, interposed between the same and the abutting end of the supplemental spindle section 68. The supplemental spindle section 68 carries a radially projected curved arm 71 which, at its end, is formed with a guide eye 71ᵃ, through which the thread from the spool 69ᵃ is passed. The arm 70 acts as a flier to wind the thread around the compacted grass blades, and it is not, of course, passed through the bore of the supplemental sleeve section which carries it, but is mounted at one side thereof. In this double machine, the described spindles, and parts carried thereby, are of course duplicated. Both spindles are driven from a belt 72 which runs over the spindle pulleys 66, and under the pulley 13 of the long countershaft 12 (see particularly Figs. 2 and 4). To take up the slack of the belt 72, and to permit the frame 58, and the spindles carried thereby, to be moved pivotally upward as shown in Fig. 6, a weighted tightening pulley 73 is hung upon the downwardly drawn intermediate portion of the belt 72. This pulley is loosely mounted in a bracket like bearing 74 which is mounted to slide vertically on guide rods 75 that depend from the intermediate portion of the pivoted frame 58. As shown in Figs. 2 and 6, a detachable weight 76 is hung from the bottom of the bearing 74, to give increased tension on the belt 72.

The grass, as it passes through or from between the crushing rollers 48—49, comes in contact with a rearwardly tapered concentrating spout 77 which is fixed, as shown, on a transverse supporting bar 24ᵃ, rigidly secured at its ends to the sides of the frame 1 (see Figs. 1 and 6). This concentrating spout 77 brings the hitherto loosely assembled grass blades into quite compact form, and puts the same in condition for passage through or between the so-called "drawing wheels." These so-called drawing wheels are located in pairs, the one pair just in front, and the other pair just in the rear, of the corresponding hollow spindle 64.

The lower drawing wheels are indicated by the numeral 78, while the upper drawing wheels are indicated by the numeral 79. The said lower wheels are carried by transverse shafts 80, mounted in suitable bearings on the sides of the frame 1, and intermediate bearings 81, rigidly secured to the intermediate portions of the frame bars 24ᵃ and 24ᵇ. The upper or press members 79 of the drawing wheels are carried by short shafts 82 that are mounted in sleevelike bearings 83, which sleeves are provided with laterally projecting hinge lugs 83ᵃ that are hinged to lugs 81ᵃ of the fixed bearings 81 (see particularly Figs. 1 and 12). To the hinge lugs 83ᵃ are rigidly attached hand pieces 83ᵇ which afford levers for lifting upward, with a pivotal movement on the hinge lugs 81ᵃ, the bearing sleeves 83, shafts 82 and wheels 79.

As a simple and efficient means for yieldingly drawing downward the upper draw wheels 79, nutted bolts 84 are passed through lugs 85 on the sleeves 83 and bearings 81, and coiled springs 86 are interposed between the lower lugs 85 and nuts 87 on the said bolts. As is evident, by adjustments of the nuts 87, on the bolts 84 the tension of the springs 86 may be set so as to give any desired pressure of the drawing wheels on the twine. The lower drawing wheels, both at the front and at the rear of the spindle 64, are grooved. The upper draw wheels 79, at the rear of said spindle, are also grooved (see Fig. 13), but the upper drawing wheels 79 at the front of the spindle (see Fig. 12), have narrow flat faces, and work between the flanges of the coöperating lower wheels 78. This is a preferred but not essential arrangement of said drawing wheels. Between the two bearings 81, the shaft 80 carries a spur gear 88 that meshes with a similar spur gear 89 carried by the shaft 82 and located between the two sections of the sleeve 83 (see particularly Fig. 13). At their left hand ends, as viewed in Figs. 12 and 13, the shafts 80 are provided with sprockets 90, over which runs a sprocket chain 91 (see Fig. 1). The forward shaft 80 is also provided with a sprocket 92, over which, and the heretofore noted sprocket 39 of the roller 38, runs a sprocket chain 93.

Motion is imparted to the forward shaft 80, from the countershaft 3 (see Figs. 2 and 12), through a spur gear 94 carried by said shaft 80 and meshing with the gear 5 of said shaft 3. As is evident from the foregoing, motion is imparted from the forward shaft 80 to the rear shaft 80, through the sprocket chain 91, and is imparted to the lower feed roller 38 through the chain 93.

Referring again to Fig. 6, and observing the dotted line position of the parts, it will now be seen that when the hinged frame 58, and the spindles and other parts carried thereby, are turned pivotally upward, the spools of thread 69ª may be slid axially off from the spindles and clear of the forward upper drawing wheels 79. This construction is important, because it facilitates the application and removal of the spools of wrapping thread to the spindles and saves time. Under the above noted pivotal movement of the hinged frame and parts carried thereby, the tightening sheave 73 maintains engagement with the belt 72, under sliding movements of its sliding bearing 74 on the guide rods 75.

*Reeling mechanism.*—The reeling mechanism, which, as already stated, involves nothing novel in itself, is illustrated in Figs. 1, 2 and 5. As clearly shown in Fig. 5, the miter gear 15, on the rear end of the long countershaft 12, meshes with a miter gear 94ª carried by a short transverse shaft 95, mounted in suitable bearings on a transverse bar 24ᶜ of the frame 1, and provided at its ends with beveled pinions 96. The pinions 96 mesh with bevel gears 97 carried by large spools or windlass drums 98 that are journaled in bearings 99 on the bar 24ᶜ. In this double arrangement of the machine, the completed twine, indicated by the character $s'$, as it comes from the two twine-forming mechanisms, is simultaneously wound on the two spools 98. Each spool 98, at its lower end, carries a spur gear 100 that meshes with the spur pinion 101 carried by a vertically disposed reversely threaded screw rod 102 loosely journaled at its lower end in suitable bearings on the bar 24ᶜ. Working on each screw rod 102 is an automatically reversible traveler 103 of the usual construction, which carries a guide spout 104 through which the twine is passed on its way to the spool. The said traveler and spout and reversely threaded screw rod, act as a "deployer" to cause the twine to be wound in layers on the spools.

*Operation.*—The operation of the machine, summarized, is substantially as follows: The grass, after having been combed or otherwise treated, so that its blades lie substantially parallel, is placed in the holder afforded by the posts 18 and 22, and with its butt ends against the stop plate 23; and will then lie substantially as shown in Figs. 1 and 6. The grass blades at the lower portion of the holder will fill the flaring mouth or upper extremity of the feed slot 17, in the vertical flange of the supporting bracket 16 (see Figs. 7 and 8), and hence some of the blades will always rest upon the notched periphery of the primary feed or selecting disk 26, adjacent to the feed throat formed between the periphery of said disk and the abutting curved edge 27ª of the throat plate 27. The wall or edge 17ª of the slot 17 as before stated (see particularly Fig. 9), a short distance from the upper extremity of the throat opening, rises above the notched periphery of the disk and holds the grass blades out of contact with the disk, except in the close vicinity of the said throat opening. The notches in the periphery of the disk 26 are preferably of such size that each will take up or hold within itself one blade of grass. However, when the throat opening is made large enough, by the proper adjustments of the throat plate 27, each notch, acting directly upon one blade of grass, and indirectly upon one or more other blades, will cause the feeding of more than one blade for the passage of each notch. The said disk, acting on the blades, forces them from the holder and through the throat opening above noted, by a lateral or sidewise movement, as distinguished from an endwise or axial movement, and under such movement, delivers the blades between the diverging portions of the rollers 38 and 47 of the secondary feed device. About the same time that the grass blades are delivered between the said feed rollers, they are forced laterally out of engagement with the notches of the disk 26, by the wall 17ª of the feed slots 17, which wall or edge, at the proper point to effect such disengagement, passes outward of the notched periphery of said disk (see particularly Fig. 8). The grass blades thus delivered between the feed rollers 38 and 47 will be taken up in a regular order of succession, and fed rapidly forward, with an endwise movement, and will be delivered between the coöperating crushing rollers 48 and 49, and simultaneously with this endwise movement, said blades will, under the action of the threads on the rollers 47 be fed laterally, so that at about the same time that they are taken hold of by the said crushing rollers, they will be forced into the annular grooves 41 and 47ª of the rollers 38 and 47 respectively. Thus the blades which are taken up by the crushing rollers are released from the feed rollers 38 and 47 at approximately the same time, thereby preventing breaking of the grass. The grass is fed by the crushing rollers, through the concentrating spouts 77 and between the first pair of drawing wheels 78 and 79, from thence, through the hollow spindle 64, and its supplemental section 68, and thence through the rear pair of drawing wheels 78 and 79. The two pairs of drawing wheels, and the crushing rollers, run approximately at the same peripheral speed. The said drawing wheels press the blades of grass into compact twine form, and keep the same drawn taut. While the overlapped blades of grass are thus held in compact, straight and parallel twine form, they are wrapped about and bound together into complete twine form, by the binding thread from the spool 69ª, which thread is continuously coiled around the same, by the revolving flier or guide arm 71.

From what has been said, it is evident that the secondary feed rollers, the crushing rollers, and the two sets of drawing wheels, all coöperate to hold the grass blades in straight, parallel, or non-twisted arrangement, so that there is produced a twine in which the blades of grass are parallel, straight, and non-twisted, as distinguished from a twine in which the blades of grass are twisted or spirally arranged. From the twine-forming mechanism, the finished twine is, in the machine illustrated, wound upon the windlass spools 98 in a manner already clearly described. By adjustments of the expansible pulley 14, the speed at which the primary feed device or collecting disk will be driven with respect to the secondary feed device or feed rollers 38—47, may be materially varied, at will. Such adjustments of the relative speeds of the two feed devices are very desirable, in order to adjust the mechanism to properly feed long grass blades at one time and short grass blades at another time. As is evident, short grass blades must be fed faster from the holder than long blades, in order to give the proper body to the twine. The weighted arms 42ª on the sleeves 42, in which the rollers 47 are journaled, press the said rollers down to their work under increased force, and furthermore serve as hand pieces, by which to raise the said rollers into inoperative positions, when desired.

From the foregoing description, it is evident that the grass feeding mechanism is a very small and inexpensive contrivance. It is probably also evident from the nature of the device, and has been clearly demonstrated in practice, that the said feeding mechanism will operate in the most efficient manner even when run at very high speeds. The notched selecting disk or primary feed device, by a very simple and reliable action, selects or takes up the blades of grass from the bottom of the holder and, by a slight and simple movement, which does not agitate nor tangle up the other grass in the holder, carries the butt ends of those blades which are taken up, to the secondary feed device, and, by the latter, the said blades of grass are drawn out of the holder by an endwise movement which neither disturbs nor tangles those blades of grass which are completely within the holder and are seated against the stop plate 23.

From what has been said, it is evident that my invention, as illustrated in the drawings, and above specifically described, is capable of many modifications as to details of construction, and arrangement of parts, within the scope of my invention as herein set forth and claimed.

What I claim and desire to secure by Letters Patent of the United States is as follows:

1. In a machine of the character described, the combination with a primary grass feeding device, of a pair of feed rollers having surfaces that diverge from each other longitudinally of said rollers adapting them to receive grass delivered laterally thereto by said primary feed device, at least one of said rollers having spiral threads operating to impart limited lateral movements to the grass engaged thereby, said rollers operating to feed the grass endwise, substantially as described.

2. In a machine of the character described, the combination with twine forming mechanism, of a grass holder, a primary feed device operating to deliver the grass laterally therefrom, and a pair of feed rollers having surfaces that diverge from each other longitudinally of said rollers, adapting them to receive the grass delivered thereto under lateral movements, at least one of said rollers having spiral threads operating to impart limited lateral movements to the grass engaged thereby, said rollers operating to feed the grass endwise to said twine forming mechanism, substantially as described.

3. In a machine of the character described, the combination with a grass holder having an attenuated curved delivery throat leading from the bottom thereof, of a notched selecting disk coöperating with said throat, and operating to feed the grass laterally through said throat, a pair of coöperating feed rollers having surfaces that diverge from each other longitudinally of said rollers, adapting them to receive the grass delivered laterally thereto by said disk, one of said rollers having spiral threads for imparting limited lateral movements to the grass, said two rollers operating to feed the grass endwise, and having clearance grooves, substantially as described.

4. In a feed mechanism for a machine of the character described, a pair of coöperating feed rollers having surfaces that diverge from each other longitudinally of said rollers adapting them to receive grass blades delivered thereto by lateral movement, one of said rollers having spiral threads for insuring the lateral movements of the grass between said rollers, said rollers operating to feed the grass endwise, substantially as described.

5. In a feed mechanism for a machine of the character described, a pair of rollers having surfaces that diverge from each other longitudinally of said rollers adapting them to receive grass delivered laterally thereto, one of said rollers having spiral threads for insuring the lateral movement of the grass between said rollers, one of said rollers also having a clearance groove beyond said spiral threads, into which the grass is fed laterally by said threads, as it is fed endwise by said rollers, substantially as described.

6. In a feed mechanism for a machine of the character described, the combination with a grass holder, of guiding devices forming an attenuated curved delivery throat extending from said grass holder in a plane transversely intersecting the blades of grass held thereby, and a notched selecting disk coöperating with said throat, one wall of said throat being extended concentric to the periphery of said disk and the other wall thereof intersecting the periphery of the disk, near the extremities of said throat, and extending inward of the periphery of said disk along the intermediate portion of said throat, substantially as described.

7. In a twine forming mechanism of the character described, the combination with drawing wheels, and a tubular spindle rotatively mounted between said drawing wheels, of a pivoted support, affording a rocking bearing for said spindle, adapting the spindle to be moved into an inoperative position, so that a thread spool may be readily applied to or removed from said spindle, substantially as described.

8. In a machine of the character described, the combination with a pivotally mounted bearing, of a thread carrying spindle journaled therein, and provided with a pulley, a driving pulley, mounted on a relatively fixed part, a driving belt running over said driving pulley and the spindle pulley, and a weighted pulley, loosely hung on said belt, for keeping the same taut and permitting the pivotal movements of said spindle support, substantially as described.

9. In a machine of the character described, the combination with a pivoted spindle support and a pair of tubular thread carrying spindles journaled thereon, and each having a pulley, a driving pulley mounted on a relatively fixed part of the machine frame, guides depending from said spindle support, and a belt tightener comprising a bearing slidably mounted on said depending guides and provided with a pulley, and a driving belt running over said spindle pulleys and under said driving pulley and tightening pulley, substantially as described.

10. In a machine of the character described, the combination with a transverse feeding device, of a longitudinal feeding device, and means for varying the relative speeds of the two feeding devices, substantially as described.

11. In a machine of the character described, the combination with a grass holder, of a primary feed device involving a notched selector operative to force the grass blades laterally from said holder, a secondary feed device receiving the grass from said primary feed device and feeding the same endwise, and means for varying the speed of said notched selector with respect to said secondary feed device, substantially as described.

12. In a machine of the character described, the combination with a grass holder and twine forming mechanism, of a primary feed device involving a notched selecting disk operative to force the grass blades laterally from said holder, a secondary feed device receiving the grass from said primary feed device and feeding the same endwise to said twine forming mechanism, and means for varying the speed of said selecting disk with respect to said secondary feed device, substantially as described.

13. In a machine of the character described, a grass feeding mechanism comprising a notched selector operative to feed the grass laterally, and a rigid throat plate coöperating with said notched selector, and adjustable with respect thereto, to vary the throat opening or feed passage through which the grass is fed laterally, substantially as described.

14. In a machine of the character described, the combination with a grass holder, of a notched selecting disk operative to feed the grass laterally therefrom, and a rigid throat plate curved at one edge, to follow the periphery of said notched disk, and adjustable edgewise with respect thereto, to vary the throat opening or passage formed between the periphery of said disk and the curved surface of said plate, substantially as described.

15. In a feed mechanism for a machine of the character described, a pair of feed rollers having surfaces that diverge from each other longitudinally of said rollers, adapting them to receive grass blades delivered thereto by lateral movements and a weighted bearing in which one of said rollers is mounted, substantially as described.

In testimony whereof I affix my signature in presence of two witnesses.

KARL WESSEL.

Witnesses:
 ROBERT C. MABEY,
 F. D. MERCHANT.